US011687489B2

(12) United States Patent
Zhao et al.

(10) Patent No.: US 11,687,489 B2
(45) Date of Patent: Jun. 27, 2023

(54) METHOD AND SYSTEM FOR IDENTIFYING GARBAGE DATA, ELECTRONIC DEVICE, AND STORAGE MEDIUM

(71) Applicant: Inspur Electronic Information Industry Co., Ltd, Jinan (CN)

(72) Inventors: Yu Zhao, Jinan (CN); Yonggang Hu, Jinan (CN)

(73) Assignee: INSPUR ELECTRONIC INFORMATION INDUSTRY CO., LTD., Jinan (CN)

( * ) Notice: Subject to any disclaimer, the term of this patent is extended or adjusted under 35 U.S.C. 154(b) by 0 days.

(21) Appl. No.: 17/789,336

(22) PCT Filed: Aug. 24, 2020

(86) PCT No.: PCT/CN2020/110732
§ 371 (c)(1),
(2) Date: Jun. 27, 2022

(87) PCT Pub. No.: WO2021/128893
PCT Pub. Date: Jul. 1, 2021

(65) Prior Publication Data
US 2022/0374394 A1 Nov. 24, 2022

(30) Foreign Application Priority Data
Dec. 26, 2019 (CN) .......................... 201911367801.0

(51) Int. Cl.
*G06F 16/00* (2019.01)
*G06F 16/16* (2019.01)
(Continued)

(52) U.S. Cl.
CPC ........ *G06F 16/162* (2019.01); *G06F 12/0253* (2013.01); *G06F 16/122* (2019.01); *G06F 16/13* (2019.01); *G06F 16/1737* (2019.01)

(58) Field of Classification Search
None
See application file for complete search history.

(56) References Cited

U.S. PATENT DOCUMENTS 5,687,368 A    11/1997  Nilsen
7,299,325 B1 * 11/2007  Waterhouse ........ G06F 11/2094
                                                       711/159
(Continued)

FOREIGN PATENT DOCUMENTS

CN    106708912 A    5/2017
CN    107066604 A    8/2017
(Continued)

OTHER PUBLICATIONS

International Search Report dated Nov. 27, 2020 (6 pages including English translation) from PCT Priority Application PCT/CN2020/110732 filed Aug. 24, 2020.
(Continued)

*Primary Examiner* — Hasanul Mobin
(74) *Attorney, Agent, or Firm* — Crowell & Moring LLP

(57) ABSTRACT

A method and system for identifying garbage data, an electronic device, and a storage medium. The method includes: uploading an object to a distributed object storage system; acquiring a head object identifier in an index storage pool of the distributed object storage system; querying a data storage pool for a target data group corresponding to the head object identifier; marking a tail object corresponding to a tail object identifier in the target data group as a target tail object; and marking tail objects in the data storage pool other than the target tail object as garbage data.

17 Claims, 2 Drawing Sheets

(51) Int. Cl.
  *G06F 16/17*      (2019.01)
  *G06F 16/11*      (2019.01)
  *G06F 16/13*      (2019.01)
  *G06F 12/02*      (2006.01)

(56) References Cited

U.S. PATENT DOCUMENTS

| | | | | |
|---|---|---|---|---|
| 8,074,014 | B2* | 12/2011 | Narayanan | G06F 1/3203 |
| | | | | 711/112 |
| 8,321,631 | B2* | 11/2012 | Baek | G06F 11/1076 |
| | | | | 711/E12.009 |
| 10,540,095 | B1* | 1/2020 | Cheng | G06F 16/14 |
| 10,783,136 | B1* | 9/2020 | Volkov | G06F 3/0652 |
| 2009/0013622 | A1 | 5/2009 | Rossmann et al. | |
| 2012/0117406 | A1* | 5/2012 | Eun | G06F 1/3275 |
| | | | | 711/170 |
| 2012/0260150 | A1* | 10/2012 | Cideciyan | G06F 11/1008 |
| | | | | 714/E11.054 |
| 2013/0036278 | A1* | 2/2013 | Strzelczak | G06F 3/0683 |
| | | | | 711/E12.001 |
| 2014/0330873 | A1* | 11/2014 | Cha | G06F 16/162 |
| | | | | 707/813 |
| 2015/0120684 | A1* | 4/2015 | Bawaskar | G06F 16/137 |
| | | | | 707/693 |
| 2015/0178191 | A1* | 6/2015 | Camp | G06F 12/0246 |
| | | | | 711/103 |
| 2016/0092496 | A1* | 3/2016 | Dietterich | G06F 12/0276 |
| | | | | 707/692 |
| 2016/0188219 | A1* | 6/2016 | Peterson | G06F 12/0246 |
| | | | | 711/103 |
| 2016/0306822 | A1* | 10/2016 | Waghulde | G06F 16/1847 |
| 2017/0123718 | A1* | 5/2017 | Sinha | G06F 3/0688 |
| 2019/0007206 | A1* | 1/2019 | Surla | H04L 63/10 |
| 2019/0007208 | A1* | 1/2019 | Surla | H04L 9/0891 |
| 2019/0057090 | A1 | 2/2019 | Xie et al. | |

FOREIGN PATENT DOCUMENTS

| | | |
|---|---|---|
| CN | 107818136 A | 3/2018 |
| CN | 108415986 A | 8/2018 |
| CN | 110222039 A | 9/2019 |
| CN | 111177075 A | 5/2020 |

OTHER PUBLICATIONS

Written Opinion dated Nov. 24, 2020 (9 pages including English translation) from PCT Priority Application PCT/CN2020/110732 filed Aug. 24, 2020.

Search Report dated Feb. 15, 2022; from Chinese Priority Application Chinese Application No. 201911367801.0 (2 pages in foreign text).

Notification to Grant dated Mar. 3, 2022 from Chinese Priority Application Chinese Application No. 201911367801.0 (3 pages including English Translation).

Article, Cheng, Liang "Identification and Removal of Garbage Objects", 4 pages, dated Oct. 1, 1998.

W. Setiawan, A. Wahyudin and G. R. Widianto, "The use of scale invariant feature transform (SIFT) algorithms to identification garbage images based on product label," *2017 3rd International Conference on Science in Information Technology (ICSITech)*, 2017, pp. 336-341, doi: 10.1109/ICSI Tech.2017. 8257135.

* cited by examiner

METHOD AND SYSTEM FOR IDENTIFYING GARBAGE DATA, ELECTRONIC DEVICE, AND STORAGE MEDIUM

This application is the national phase application of International Application No. PCT/CN2020/110732, filed Aug. 24, 2020, which claims priority to Chinese Patent Application No. 201911367801.0, filed on Dec. 26, 2019 in China National Intellectual Property Administration and entitled "Method and System for Identifying Garbage Data, Electronic Device, and Storage Medium", each of which is hereby incorporated by reference in its entirety.

FIELD

The present application relates to the technical field of computers, in particular to a method and system for identifying garbage data, an electronic device, and a storage medium.

BACKGROUND

When an object is uploaded to a distributed object storage system, the object needs to be split into one head object and a plurality of tail objects with a size less than or equal to 4 MB. The tail objects and the head object are uploaded to a data storage pool successively. However, in the process of writing the tail objects into the data storage pool, in case of abnormal interruption of the process such as a power failure, the tail objects are written into the data storage pool, and the manifest structure that records the tail object information and the head object may not be written into the data storage pool. Then, the tail objects that are written into the data storage pool become garbage data that are inaccessible.

Therefore, how to identify garbage data in a distributed object storage system is a technical problem that those skilled in the art need to solve at present.

SUMMARY

The present application aims to provide a method and system for identifying garbage data, an electronic device, and a storage medium, which can identify garbage data in a distributed object storage system.

In order to solve the above-mentioned technical problems, the present application provides a method for identifying garbage data, the method includes:

uploading an object to a distributed object storage system;

acquiring a head object identifier in an index storage pool of the distributed object storage system;

querying a data storage pool for a target data group corresponding to the head object identifier, wherein the target data group includes data content of a head object and a tail object identifier corresponding to the head object;

marking a tail object corresponding to the tail object identifier in the target data group as a target tail object;

marking tail objects in the data storage pool other than the target tail object as garbage data.

Optionally, the uploading an object to a distributed object storage system includes:

splitting the object to be uploaded into a head object to be uploaded and tail objects to be uploaded;

allocating a head object identifier to the head object to be uploaded, and allocating tail object identifiers to the tail objects to be uploaded;

writing data content of the tail objects to be uploaded into the data storage pool according to a splitting order;

writing, into the data storage pool, data content of the head object to be uploaded and the tail object identifier of the tail object to be uploaded corresponding to the head object to be uploaded as the target data group; and writing the head object identifier of the head object to be uploaded into the index storage pool.

Optionally, the tail object identifiers of the tail objects to be uploaded are stored in the data storage pool in a manifest structure.

Optionally, the splitting the object to be uploaded into a head object to be uploaded and tail objects to be uploaded includes:

splitting the object to be uploaded into one head object to be uploaded and a plurality of tail objects to be uploaded according to a preset strategy, wherein a data size of the head object to be uploaded is less than a first preset value;

a data size of each tail object to be uploaded is less than a second preset value; and the first preset value is less than the second preset value.

Optionally, the writing the head object identifier of the head object to be uploaded into the index storage pool includes:

writing the head object identifier of the head object to be uploaded into a bucket of the index storage pool;

and correspondingly, the acquiring a head object identifier in an index storage pool of the distributed object storage system includes:

acquiring the head object identifier from the bucket of the index storage pool of the distributed object storage system.

Optionally, after the marking tail objects in the data storage pool other than the target tail object as garbage data, the method further includes:

deleting the garbage data in the data storage pool.

Optionally, the method further includes:

upon receiving an object access instruction, querying the index storage pool for a target head object identifier corresponding to the object access instruction;

returning the data content of the head object, corresponding to the target head object identifier, in the data storage pool and the data content of the tail objects to an access end as an access result.

The present application further provides a system for identifying garbage data, the system includes:

an object uploading module, configured to upload an object to a distributed object storage system;

a head object identifier acquisition module, configured to acquire a head object identifier in an index storage pool of the distributed object storage system;

a data group query module, configured to query a data storage pool for a target data group corresponding to the head object identifier, wherein the target data group includes data content of a head object and a tail object identifier corresponding to the head object;

a marking module, configured to mark a tail object corresponding to the tail object identifier in the target data group as a target tail object;

a garbage data identification module, configured to mark tail objects in the data storage pool other than the target tail object as garbage data.

The present application also provides a storage medium, having a computer program stored thereon which, when executed, implements the steps of the above method for identifying garbage data.

The present application also provides an electronic device, including a memory and a processor, wherein the memory has a computer program stored thereon; and the processor, when calling the computer program stored in the memory, implements the steps of the above method for identifying garbage data.

The present application provides a method for identifying garbage data, including: uploading an object to a distributed object storage system; acquiring a head object identifier in an index storage pool of the distributed object storage system; querying a data storage pool for a target data group corresponding to the head object identifier, wherein the target data group includes data content of a head object and a tail object identifier corresponding to the head object; marking a tail object corresponding to the tail object identifier in the target data group as a target tail object; marking tail objects in the data storage pool other than the target tail object as garbage data.

In the present application, the head object identifier is first acquired from the index storage pool of the distributed object storage system; the tail object identifier corresponding to the head object is queried on the basis of the head object identifier; the tail object corresponding to the tail object identifier in the data storage pool is marked as the target tail object; and the tail objects that are not marked as target tail objects are marked as garbage data. The tail objects are stored in the data storage pool, but the head object is not stored in the data storage pool, which will cause garbage data. Therefore, in the present application, the tail object which corresponds to the head object and has been stored in the data storage pool is determined on the basis of the head object identifier, and then the tail objects that do not correspond to the head object are marked as garbage data. It can be seen that the present application can identify garbage data in a distributed object storage system. The present application also provides a system for identifying garbage data, an electronic device and a storage medium, which have the foregoing beneficial effects. Elaborations are omitted herein.

BRIEF DESCRIPTION OF THE DRAWINGS

In order to describe the technical solutions in the embodiments of the present application or the conventional art more clearly, the drawings needed to be used in descriptions about the embodiments or the conventional art will be simply introduced below. It is apparent that the drawings described below are merely some embodiments of the present application. Other drawings may further be obtained by those of ordinary skill in the art according to these drawings without creative work.

DETAILED DESCRIPTION

Figure 1:
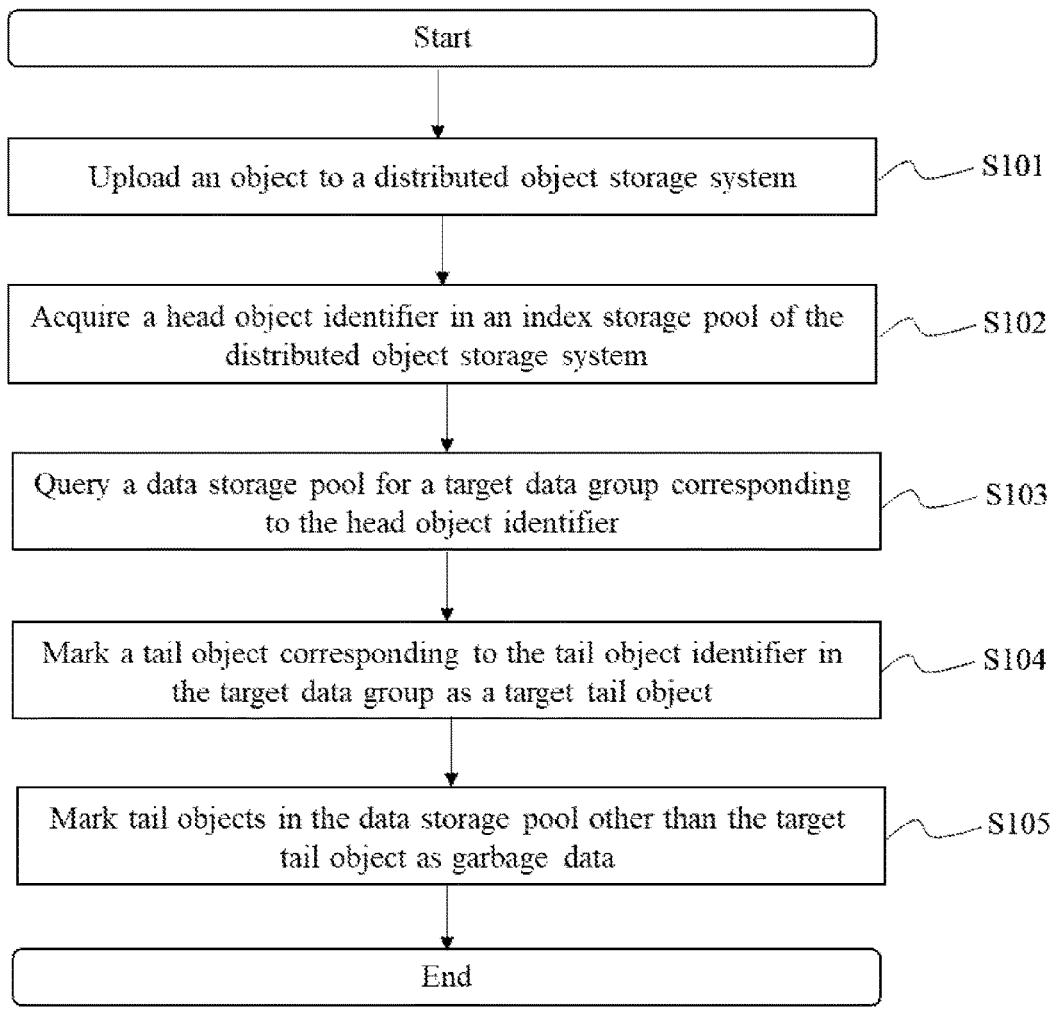
FIG. 1 is a flowchart of a method for identifying garbage data according to embodiments of the present application.

In order to make the objective, technical solutions, and advantages of the embodiments of the present application clearer, the technical solutions in the embodiments of the present application will be described clearly and completely below in combination with the drawings in the embodiments of the present application. Based on the embodiments of the present application, all other embodiments obtained by those skilled in the art without creative work shall fall within the protection scope of the present application.

References are made to FIG. 1 below, which is a flowchart of a method for identifying garbage data according to embodiments of the present application.

The following specific steps may be included.

S101: upload an object to a distributed object storage system.

This embodiment is applied to a distributed object storage system. As a feasible implementation, this embodiment can upload an object to the distributed storage system by means of a PUT instruction. In the uploading process, the object can be first split into one head object and a plurality of tail objects with a size less than or equal to a preset size. Each section of head object and tail object will generate one unique identifier (object identifier (oid)). First, the tail objects are respectively written into a data storage pool in sequence according to a splitting order. Then, manifest structures that record tail object identifier information and data content of the head object are written into the data storage pool. Finally, identifier information of the head object is written into an index storage pool. It can be understood that an object can be split into a head object and tail objects according to data positions. The head object is an object header, and the tail objects are other data other than the object header. One object can be split into one head object and at least one tail object. A storage pool is a group of magnetic disks for storing data in a storage system.

For example, in this embodiment, the operation of storing an object in the distribution object storage system is uploading target data A to the distributed object storage system. At this time, target data A is first split into head object A1, tail object A2 and tail object A3. The object identifier of head object A1 is 001; the object identifier of tail object A2 is 002; and the object identifier of tail object A3 is 003. The data content of both tail object A2 and tail object A3 is first stored in the data storage pool. Head object A1, object identifier 002 and object identifier 003 are then stored in the data storage pool. Finally, object identifier 001 is stored in the index storage pool.

S102: acquire a head object identifier in an index storage pool of the distributed object storage system.

Before this step, there may be an operation of receiving a garbage data detection instruction. Of course, this embodiment can also acquire the head object identifier in the index storage pool of the distributed object storage system according to a preset cycle, so as to achieve regular detection of garbage data for the distributed object storage system. The index storage pool may store the head object identifier of the head object. Specifically, the index storage pool may store an object identifier in the form of a bucket.

S103: query a data storage pool for a target data group corresponding to the head object identifier.

In this step, on the basis of the head object identifier that has been obtained, a target data group, corresponding to the head object identifier, in the data storage pool can be queried. Specifically, the above-mentioned target data group may include data content of the head object and a tail object identifier corresponding to the head object. That is, the data content of the head object in the data storage pool and the tail object identifiers of the tail object are stored in the data storage pool together. On the basis of obtaining the head object identifier, the data storage pool can be queried for the data content of the head object corresponding to the head object identifier, thus obtaining the tail object identifier corresponding to the data content of the head object. As a feasible implementation, in this embodiment, the head object identifier can be obtained by mapping (such as Hash mapping) the data content of the head object, whereby the data content of the corresponding head object can be determined according to the head object identifier. In the same way, the data content of the corresponding tail object can be determined according to the tail object identifier.

S104: mark a tail object corresponding to the tail object identifier in the target data group as a target tail object.

This embodiment can determine the tail object identifier in the target data group, thus marking the tail object, corresponding to the tail object identifier in the target data group, in the data storage pool as the target tail object. That is, in the process of storing the target tail object in the data storage pool, the data of the head object corresponding to the target tail object is also written into the data storage pool, and the target tail object is not garbage data.

S105: mark tail objects in the data storage pool other than the target tail object as garbage data.

In this step, on the basis that the target tail object has been determined, the tail objects in the data storage pool other than the target tail object can be marked as garbage data. That is, there are no head objects corresponding to the tail objects in the storage pool other than the target tail object, and these tail objects cannot be accessed.

In the present embodiment, the head object identifier is first acquired from the index storage pool of the distributed object storage system; the tail object identifier corresponding to the head object is queried on the basis of the head object identifier; the tail object corresponding to the tail object identifier in the data storage pool is marked as the target tail object; and the tail objects that are not marked as target tail objects are marked as garbage data. The tail objects are stored in the data storage pool, but the head object is not stored in the data storage pool, which will cause garbage data. Therefore, in the present embodiment, the tail object which corresponds to the head object and has been stored in the data storage pool is determined on the basis of the head object identifier, and then the tail objects that do not correspond to the head object are marked as garbage data. It can be seen that the present embodiment can identify garbage data in a distributed object storage system.

As a further description of the embodiment corresponding to FIG. 1, after tail objects in the data storage pool other than the target tail object are marked as garbage data, the garbage data in the data storage pool can also be deleted.

As a further description of the embodiment corresponding to FIG. 1, upon receiving an object access instruction, querying the index storage pool for a target head object identifier corresponding to the object access instruction; returning the data content of the head object, corresponding to the target head object identifier, in the data storage pool and the data content of the tail objects to an access end as an access result.

As a further description of the embodiment corresponding to FIG. 1, the process of uploading an object in S101 may specifically include the following operations:

step 1: splitting the object to be uploaded into a head object to be uploaded and tail objects to be uploaded;

wherein in this step, the object to be uploaded can be split into one head object to be uploaded and a plurality of tail objects to be uploaded according to a preset strategy, wherein a data size of the head object to be uploaded is less than a first preset value; a data size of each tail object to be uploaded is less than a second preset value; and the first preset value is less than the second preset value;

step 2: allocating a head object identifier to the head object to be uploaded, and allocating tail object identifiers to the tail objects to be uploaded;

step 3: writing data content of the tail objects to be uploaded into the data storage pool according to a splitting order;

step 4: writing, into the data storage pool, data content of the head object to be uploaded and the tail object identifier of the tail object to be uploaded corresponding to the head object to be uploaded as the target data group;

wherein in this step, the tail object identifiers of the tail objects to be uploaded are stored in the data storage pool in a manifest structure. Specifically, manifest is a kind of data defined in the storage system and is used for managing a correspondence relationship between an application object and a rados object. During downloading of an object, an intact application object can be downloaded by means of reading manifest information in a head object.

step 5: writing the head object identifier of the head object to be uploaded into the index storage pool.

As a feasible implementation, in the above-mentioned implementation, the head object identifier of the head object to be uploaded can be written into a bucket of the index storage pool, whereby the head object identifier is acquired from the bucket of the index storage pool of the distributed object storage system.

The flow described in the above-mentioned embodiment will be described below with an embodiment in a practical application.

When one object is uploaded to the distributed object storage system, the storage system will split object data into a head object with a size of 512 KB and a plurality of tail objects with a size less than or equal to 4 MB according to a certain strategy. The process of storing an object to the storage pool by the storage system is: first storing all tail objects to the data storage pool in order, and naming the tail objects by their respective object identifiers; then storing manifest structures that record all the tail objects and the head object to the data storage pool together, and naming the whole after the object identifier of the head object; and finally, writing object identifier information of the head object into an object identifier storage space of a storage bucket in the index storage pool.

Figure 2:
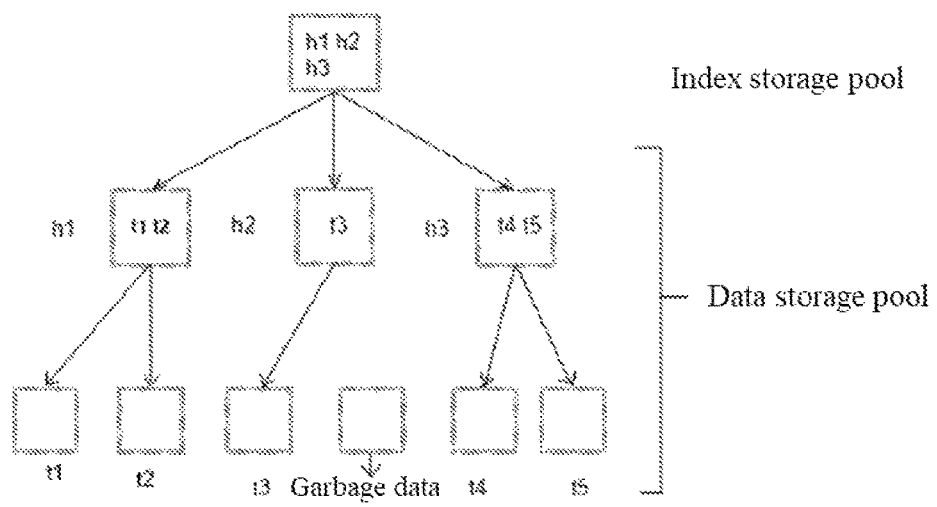
FIG. 2 is a schematic diagram of relationships between head objects and tail objects provided by embodiments of the present application.

According to a storage policy for objects and association relationships between various object identifiers, this embodiment proposes a method for identifying garbage data: traversing object identifier stored in a bucket in an index storage pool; then traversing a head object identifier in a data storage pool according to the object identifiers stored in the bucket, and marking the head object identifier; finding out all tail objects corresponding to a head object according to the head object identifier, and marking all the tail objects; and finally marking all unmarked tail objects in the data storage pool as garbage data. Referring to FIG. 2, FIG. 2 is a schematic diagram of relationships between head objects and tail objects provided by an embodiment of the present application. In FIG. 2, h1, h2 and h3 are head object identifiers; t1, t2, t3, t4, t5 and t6 are tail object identifiers; a bucket stores object identifiers h1, h2 and h3, and then the data storage pool is queried for tail object identifiers t1, t2, t3, t4 and t5 corresponding to h1, h2 and h3. Therefore, data content of a tail object without a tail object identifier is marked as garbage data.

The above embodiment proposes a method for identifying garbage data in a storage system, which provides a solution for cleaning garbage in the storage system, enriches functions of the distributed object storage system, improves the utilization rate of the disk space of the storage system, and avoids waste of the disk space. Garbage data can be accurately cleaned.

Figure 3:
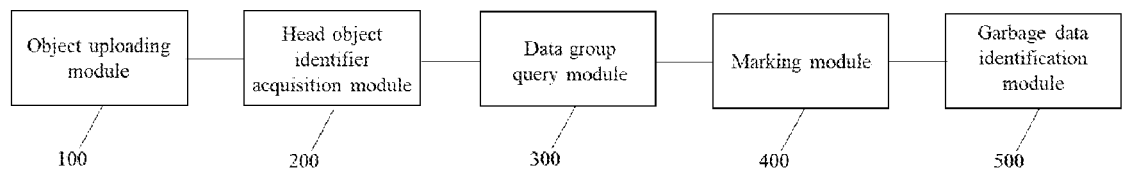
FIG. 3 is a schematic structural diagram of a system for identifying garbage data according to embodiments of the present application.

Referring to FIG. 3, which is a schematic structural diagram of a system for identifying garbage data according to embodiments of the present application.

The system may include:

an object uploading module 100, configured to upload an object to a distributed object storage system;

a head object identifier acquisition module 200, configured to acquire a head object identifier in an index storage pool of the distributed object storage system;

a data group query module 300, configured to query a data storage pool for a target data group corresponding to the head object identifier, wherein the target data group includes data content of a head object and a tail object identifier corresponding to the head object;

a marking module 400, configured to mark a tail object corresponding to the tail object identifier in the target data group as a target tail object;

a garbage data identification module 500, configured to mark tail objects in the data storage pool other than the target tail object as garbage data.

In the present embodiment, the head object identifier is first acquired from the index storage pool of the distributed object storage system; the tail object identifier corresponding to the head object is queried on the basis of the head object identifier; the tail object corresponding to the tail object identifier in the data storage pool is marked as the target tail object; and the tail objects that are not marked as target tail objects are marked as garbage data. The tail objects are stored in the data storage pool, but the head object is not stored in the data storage pool, which will cause garbage data. Therefore, in the present embodiment, the tail object which corresponds to the head object and has been stored in the data storage pool is determined on the basis of the head object identifier, and then the tail objects that do not correspond to the head object are marked as garbage data. It can be seen that the present embodiment can identify garbage data in a distributed object storage system.

Further, the object uploading module 100 includes:

an object splitting unit configured to split the object to be uploaded into a head object to be uploaded and tail objects to be uploaded;

an identifier allocation unit configured to allocate a head object identifier to the head object to be uploaded, and allocate tail object identifiers to the tail objects to be uploaded;

a data writing unit configured to write data content of the tail objects to be uploaded into the data storage pool according to a splitting order; to write, into the data storage pool, data content of the head object to be uploaded and the tail object identifier of the tail object to be uploaded corresponding to the head object to be uploaded as the target data group; and to writing the head object identifier of the head object to be uploaded into the index storage pool.

Further, the tail object identifiers of the tail objects to be uploaded are stored in the data storage pool in a manifest structure.

Further, the object splitting unit is specifically a unit configured to split the object to be uploaded into one head object to be uploaded and a plurality of tail objects to be uploaded according to a preset strategy, wherein a data size of the head object to be uploaded is less than a first preset value; a data size of each tail object to be uploaded is less than a second preset value; and the first preset value is less than the second preset value.

Further, the data writing unit is configured to write the head object identifier of the head object to be uploaded into a bucket of the index storage pool.

Correspondingly, the head object identifier acquisition module 200 includes: acquiring the head object identifier from the bucket of the index storage pool of the distributed object storage system.

Further, the system further includes:

a data cleaning module configured to delete the garbage data in the data storage pool, after the marking tail objects in the data storage pool other than the target tail object as garbage data.

Further, the system further includes:

an object access module configured to, upon receiving an object access instruction, query the index storage pool for a target head object identifier corresponding to the object access instruction; and return the data content of the head object, corresponding to the target head object identifier, in the data storage pool and the data content of the tail objects to an access end as an access result.

The embodiment of the system part is in mutual correspondence with the embodiment of the method part. Therefore, the embodiment of the system part refers to the descriptions about the embodiment of the method part, and will not be elaborated temporarily herein.

The present application also provides a storage medium, having a computer program stored thereon which, when executed, may implement the steps provided in the above-mentioned embodiment. The storage medium may include various media capable of storing program codes such as a U disk, a mobile hard disk, a Read-Only Memory (ROM), a Random Access Memory (RAM), a magnetic disk, or an optical disk.

The present application also provides an electronic device, which may include a memory and a processor. The memory stores a computer program. The processor, when calling the computer program in the memory, may implement the steps provided in the above-mentioned embodiment. Certainly, the electronic device may further include various network interfaces, a power supply, and other components.

All the embodiments in this specification are described in a progressive manner. Contents mainly described in each embodiment are different from those described in other embodiments. Same or similar parts of all the embodiments refer to each other. For the system disclosed in the embodiments, since it corresponds to the method disclosed in the embodiments, the description is relatively simple, and the relevant part can be referred to the description of the method part. It should be noted that for a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. With no more restrictions, an element defined by statement "including a/an" does not exclude the existence of the same other elements in a process, method, object, or device including the element.

The invention claimed is:

1. A method for identifying garbage data, characterized by comprising:
uploading an object to a distributed object storage system;
acquiring a head object identifier in an index storage pool of the distributed object storage system;
querying a data storage pool for a target data group corresponding to the head object identifier, wherein the target data group includes data content of a head object and a tail object identifier corresponding to the head object;
marking a tail object corresponding to the tail object identifier in the target data group as a target tail object; and
marking tail objects in the data storage pool other than the target tail object as garbage data;
wherein the uploading an object to a distributed object storage system comprises:
splitting the object to be uploaded into a head object to be uploaded and tail objects to be uploaded;
allocating a head object identifier to the head object to be uploaded, and allocating tail object identifiers to the tail objects to be uploaded;
writing data content of the tail objects to be uploaded into the data storage pool according to a splitting order;
writing, into the data storage pool, data content of the head object to be uploaded and the tail object identifier of the tail object to be uploaded corresponding to the head object to be uploaded as the target data group; and
writing the head object identifier of the head object to be uploaded into the index storage pool.

2. The method according to claim 1, wherein the tail object identifiers of the tail objects to be uploaded are stored in the data storage pool in a manifest structure.

3. The method according to claim 1, wherein the splitting the object to be uploaded into a head object to be uploaded and tail objects to be uploaded comprises:
splitting the object to be uploaded into one head object to be uploaded and a plurality of tail objects to be uploaded according to a preset strategy;
wherein a data size of the head object to be uploaded is less than a first preset value; a data size of each tail object to be uploaded is less than a second preset value; and the first preset value is less than the second preset value.

4. The method according to claim 1, wherein the writing the head object identifier of the head object to be uploaded into the index storage pool comprises:
writing the head object identifier of the head object to be uploaded into a bucket of the index storage pool;
and correspondingly, the acquiring a head object identifier in an index storage pool of the distributed object storage system includes:
acquiring the head object identifier from the bucket of the index storage pool of the distributed object storage system.

5. The method according to claim 1, wherein after the marking tail objects in the data storage pool other than the target tail object as garbage data, the method further comprises:
deleting the garbage data in the data storage pool.

6. The method according to claim 1, further comprising:
upon receiving an object access instruction, querying the index storage pool for a target head object identifier corresponding to the object access instruction; and
returning the data content of the head object, corresponding to the target head object identifier, in the data storage pool and the data content of the tail objects to an access end as an access result.

7. An electronic device comprising:
a memory storing a computer program; and
a processor configured to execute the computer program, and upon execution of the computer program, is configured to perform operations comprising:
uploading an object to a distributed object storage system;
acquiring a head object identifier in an index storage pool of the distributed object storage system;
querying a data storage pool for a target data group corresponding to the head object identifier, wherein the target data group includes data content of a head object and a tail object identifier corresponding to the head object;
marking a tail object corresponding to the tail object identifier in the target data group as a target tail object; and
marking tail objects in the data storage pool other than the target tail object as garbage data;
wherein the uploading an object to a distributed object storage system comprises:
splitting the object to be uploaded into a head object to be uploaded and tail objects to be uploaded;
allocating a head object identifier to the head object to be uploaded, and allocating tail object identifiers to the tail objects to be uploaded;
writing data content of the tail objects to be uploaded into the data storage pool according to a splitting order;
writing, into the data storage pool, data content of the head object to be uploaded and the tail object identifier of the tail object to be uploaded corresponding to the head object to be uploaded as the target data group; and
writing the head object identifier of the head object to be uploaded into the index storage pool.

8. The electronic device according to claim 7, wherein the tail object identifiers of the tail objects to be uploaded are stored in the data storage pool in a manifest structure.

9. The electronic device according to claim 7, wherein the splitting the object to be uploaded into a head object to be uploaded and tail objects to be uploaded comprises:
splitting the object to be uploaded into one head object to be uploaded and a plurality of tail objects to be uploaded according to a preset strategy;
wherein a data size of the head object to be uploaded is less than a first preset value; a data size of each tail object to be uploaded is less than a second preset value; and the first preset value is less than the second preset value.

10. The electronic device according to claim 7, wherein the writing the head object identifier of the head object to be uploaded into the index storage pool comprises:
writing the head object identifier of the head object to be uploaded into a bucket of the index storage pool;
and correspondingly, the acquiring a head object identifier in an index storage pool of the distributed object storage system includes:
acquiring the head object identifier from the bucket of the index storage pool of the distributed object storage system.

11. The electronic device according to claim 7, wherein after the marking tail objects in the data storage pool other than the target tail object as garbage data, the method further comprises:

deleting the garbage data in the data storage pool.

12. The electronic device according to claim 7, further comprising:

upon receiving an object access instruction, querying the index storage pool for a target head object identifier corresponding to the object access instruction; and returning the data content of the head object, corresponding to the target head object identifier, in the data storage pool and the data content of the tail objects to an access end as an access result.

13. A non-transitory computer-readable storage medium storing a computer program that is executable by a processor, and upon execution by the processor, is configured to cause the processor to perform operations comprising:

uploading an object to a distributed object storage system;

acquiring a head object identifier in an index storage pool of the distributed object storage system;

querying a data storage pool for a target data group corresponding to the head object identifier, wherein the target data group includes data content of a head object and a tail object identifier corresponding to the head object;

marking a tail object corresponding to the tail object identifier in the target data group as a target tail object; and marking tail objects in the data storage pool other than the target tail object as garbage data;

wherein the uploading an object to a distributed object storage system comprises:

splitting the object to be uploaded into a head object to be uploaded and tail objects to be uploaded;

allocating a head object identifier to the head object to be uploaded, and allocating tail object identifiers to the tail objects to be uploaded;

writing data content of the tail objects to be uploaded into the data storage pool according to a splitting order;

writing, into the data storage pool, data content of the head object to be uploaded and the tail object identifier of the tail object to be uploaded corresponding to the head object to be uploaded as the target data group; and writing the head object identifier of the head object to be uploaded into the index storage pool.

14. The non-transitory computer-readable storage medium according to claim 13, wherein the tail object identifiers of the tail objects to be uploaded are stored in the data storage pool in a manifest structure.

15. The non-transitory computer-readable storage medium according to claim 13, wherein the splitting the object to be uploaded into a head object to be uploaded and tail objects to be uploaded comprises:

splitting the object to be uploaded into one head object to be uploaded and a plurality of tail objects to be uploaded according to a preset strategy;

wherein a data size of the head object to be uploaded is less than a first preset value; a data size of each tail object to be uploaded is less than a second preset value; and the first preset value is less than the second preset value.

16. The non-transitory computer-readable storage medium according to claim 13, wherein the writing the head object identifier of the head object to be uploaded into the index storage pool comprises:

writing the head object identifier of the head object to be uploaded into a bucket of the index storage pool;

and correspondingly, the acquiring a head object identifier in an index storage pool of the distributed object storage system includes:

acquiring the head object identifier from the bucket of the index storage pool of the distributed object storage system.

17. The non-transitory computer-readable storage medium according to claim 13, further comprising:

upon receiving an object access instruction, querying the index storage pool for a target head object identifier corresponding to the object access instruction; and returning the data content of the head object, corresponding to the target head object identifier, in the data storage pool and the data content of the tail objects to an access end as an access result.

* * * * *